United States Patent [19]
Buckingham

[11] 3,790,697
[45] Feb. 5, 1974

[54] POWER CABLE SHIELDING
[75] Inventor: Robert P. Buckingham, Wyckoff, N.J.
[73] Assignee: The Okonite Company, Ramsey, N.J.
[22] Filed: Oct. 30, 1972
[21] Appl. No.: 301,960

[52] U.S. Cl. ................ 174/102, 174/107, 174/108, 174/109
[51] Int. Cl. ............................................. H01b 7/22
[58] Field of Search ... 174/108, 109, 106, 107, 105, 174/102 R, 13; 57/145, 149

[56] References Cited
UNITED STATES PATENTS

| | | | |
|---|---|---|---|
| 3,293,351 | 12/1966 | Giaro | 174/13 X |
| 2,886,631 | 5/1959 | Muller | 174/108 |
| 3,541,221 | 11/1970 | Aupoix et al. | 174/108 X |
| 2,118,630 | 5/1938 | Waldron | 174/108 X |
| 2,604,509 | 7/1952 | Blanchard | 174/108 |
| 2,609,653 | 9/1952 | Peterson | 57/145 |

*Primary Examiner*—Bernard A. Gilheany
*Assistant Examiner*—A. T. Grimley
*Attorney, Agent, or Firm*—Colton & Stone

[57] ABSTRACT

A cable for transmitting electrical power incorporating a shield serving as a low resistance return path to carry heavy fault current. The shield comprises a multiplicity of helically wound elongate metallic elements such as straps, tapes or wires. The lay length of the metallic elements, if tapes or straps, is selected such that thermal expansion and elastic stretch of the straps or tapes is sufficient to accommodate expansion and contraction of the insulator within the elastic limit of the metallic elements. The lay length of the metallic elements, if wires, is selected such that the thermal expansion of the wires is sufficient to accommodate expansion and contraction of the insulator without elastically stretching the wires.

10 Claims, 6 Drawing Figures

DIFFERENCE BETWEEN CONDUCTOR TEMPERATURE AND SHIELD TEMPERATURE AS A FUNCTION OF INSULATION AND SCREEN THICKNESS $T_{COND.} = 90°C$, $T_{AMB.} = 20°C$
ETHYLENE - PROPYLENE RUBBER

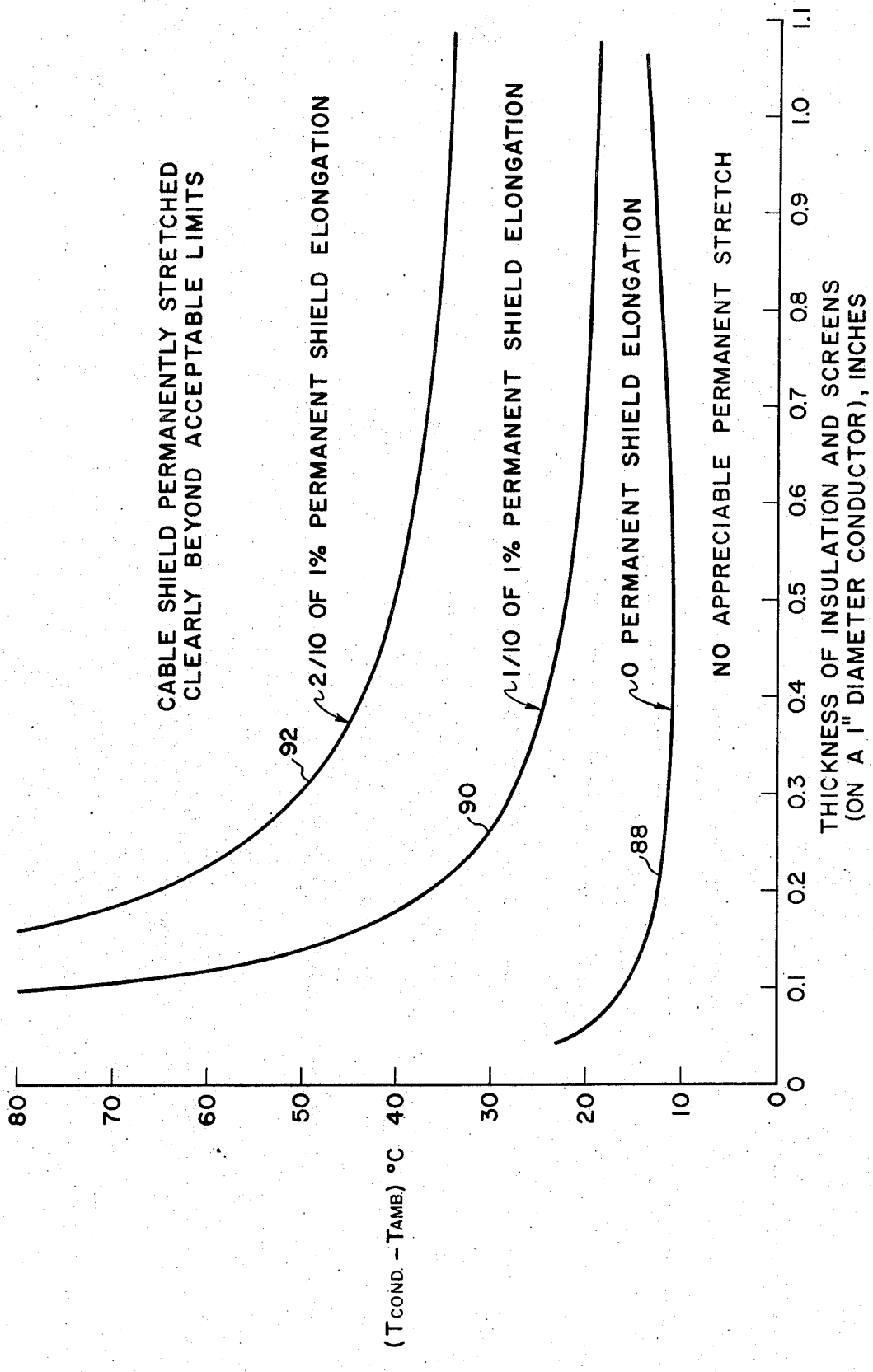

POWER CABLE SHIELDING

BACKGROUND OF THE INVENTION

This invention relates to shield systems for power cable and particularly to improving the electrical and structural stability of the shield system. The shield of a cable should theoretically meet the following requirements: (1) the shield should remain in contact with the inner cable core so that it may eliminate corona discharge which will deteriorate the insulation; (2) the shield should maintain a relatively constant conductivity high enough to carry fault current in the event of an equipment, cable or termination failure; (3) the cable should meet the first two conditions without exerting undue strain on the cable core and thereby avoid deforming the insulation.

Prior art shielding systems exhibit deficiencies in one or more of the stated requirements. Lead sheath shields maintain stable shield resistance, but due to low tensile strength and low elasticity, thermal expansion of the cable core results in the formation of air spaces between the shield and the outer layer of the cable core. This results in deterioration in the operating characteristics of the cable in response to temperature changes since the formation of air spaces tends to produce corona discharge between the inner cable core and the shield.

Helically applied round metallic wires have also been suggested as part of a shielding system. Due to the small contact area between the metallic wires and the central core and the gaps between the wires, thermal expansion of the central core forces the wires into the central core thereby causing undesirable deformation of the insulator. Helically applied metallic tapes of conventional short lay exhibit problems similar to lead sheath shields. In addition, the expansion of the central cable core under heavy load, as may be caused by subjecting the insulation to high temperatures, can cause splitting of the relatively thin metallic tapes as well as stretching and oxidation at the overlap. Subjecting the inner cable core to high temperatures causes thermal expansion thereof to such an extent that the metallic tapes are stretched beyond the elastic limit thereof. This causes the shield to change from basically a tubular configuration to that of an open helix. This results in poor or non-existent electrical contact between adjacent turns of the metallic tape thereby reducing the fault current capacity of the shield and creating the possibility of corona discharge deteriorating the quality of the insulation.

This difficulty in prior art metallic tape shielding systems was noted in the following described experiment. A conventional high voltage power cable was selected which comprised of an insulator of substantial thickness and a shield including a helically applied metallic tape of short lay. A substantial current of electricity was passed through the cable thereby substantially raising the temperature of the central conductive core and consequently raising the temperature of the entire cable. After the power was shut off and the cable cooled to ambient temperature, the exterior of the cable was noted to be loose and out of contact with the insulator. Investigation showed that the helically applied metallic tape had stretched and had not returned to its original diameter. Further investigation revealed that the metallic tape had been stretched beyond its elastic limit and accordingly could not contract to its original dimension.

In the shielding system hereinafter discussed, a multiplicity of elongate metallic elements are helically applied to the insulator of a power cable so as to substantially cover the insulating core. The length of the lay is selected to match the thermal expansion of the cable insulation material and the characteristics of the shielding material. Given the temperatures of the conductor and the shield, the volumetric coefficient of expansion of the insulating material, the linear coefficient of expansion of the shield material, the modulus of elasticity in the elastic limit of the shield material, the length of the lay is selected such that the elastic limit of the shield material is not exceeded when the cable is operated at or below its rated temperature. In the case of strap or tape shielding elements, these elements may be stretched elastically without deforming the inner conductive core because of the relatively large bearing surface therebetween. In the case of wire shielding elements, it is preferred that the lay length thereof be selected such that the wires are not elastically stretched to avoid undesirably deforming the insulator core.

It has been suggested in the prior art to provide cables with helically applied elongate metallic elements for various purposes as suggested in Great Britain Pat. No. 2,509 of 1865 and U.S. Pats. Nos. 3,095,643; 3,588,317 and 3,591,704. In addition, the disclosure of U.S. Pat. No. 3,541,221 is of some relevance.

SUMMARY OF THE INVENTION

It is an object of this invention to provide power cable having a shield exhibiting improved characteristics when the cable is subject to thermal expansion and contraction.

Another object of the invention is to provide a power cable having a shield including a multiplicity of elongate helically wound metallic elements having a lay at least sufficient to accommodate expansion and contraction of the cable insulator within the elastic limit of the metallic elements and retain the elements in contact with the insulator.

In summary, this invention comprises a power cable of the type including an inner metallic conducting core for carrying electrical energy; insulating means, around the core, and of sufficient thickness to insulate the same, subject to thermal expansion and contraction; metallic shield means comprising a multiplicity of helically wound elongate metallic elements in contact with the insulating means providing a low resistance return path; the insulator being of sufficient thickness to impart a permanent stretch to the metallic elements when operated above a predetermined temperature range; the improvement wherein the shield means comprises means for accommodating thermal expansion of the insulating means above the predetermined temperature range to maintain the stress of the metallic elements below the elastic limit thereof.

BRIEF DESCRIPTION OF THE DRAWINGS

FIG. 6 is a graph illustrating the relationship between operating and temperature range, the thickness of the insulation and screens and the permanent stretching of conventional helically wound metallic shields of short lay.

DETAILED DESCRIPTION OF THE PREFERRED EMBODIMENTS

Figure 1:
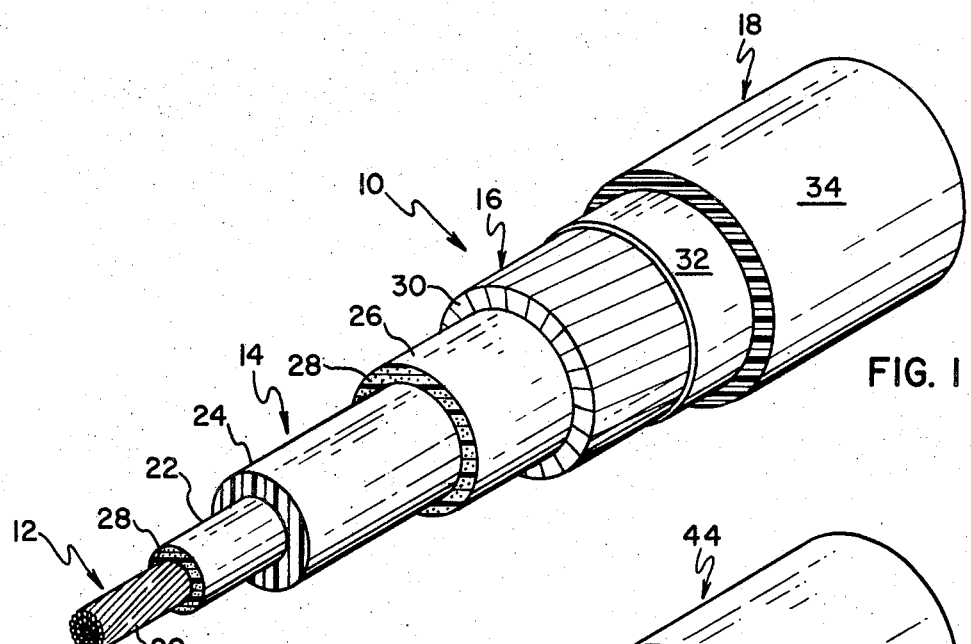
FIG. 1 is an isometric view of a cable end in accordance with this invention, the various layers of the cable being broken away for purposes of illustration, illustrating a shield means comprised of a multiplicity of helically wound edge abutted metallic straps.

FIG. 1 illustrates a power cable 10 comprising as major components a central conductive core 12, insulating means 14 surrounding the core 12, shield means 16 acting as a low resistance return path for fault currents, and an outer jacket 18 providing a measure of protection from mechanical abuse. As will be more fully pointed out hereinafter, the cable 10 is particularly designed for application involving a rather wide range of operating temperatures. Typically a wide range of operating temperatures results when power cables carry substantial quantities of electrical current.

The conductive core 12 typically comprises stranded copper wires 20. As will be appreciated by those skilled in the art, other metallic conductors are feasible. The conductive core 12 may either be stranded or solid, although the latter substantially impairs cable flexibility.

The insulating means 14 comprises a partially conductive layer or semi-conducting screen 22 around the conductive core 12, and insulator 24 around the screen 22 and an outer partially conductive layer or semi-conducting screen 26 around the insulating layer 24. The insulating layer 24 may be of any suitable type and, in one prototype of the invention, is ethylene-propylene, such as Okoguard LL, an insulating material made by the assignee of this invention. The screens 22, 26 are made of the same material but are loaded with carbon black particles 28 to provide a measure of conductivity to the screens 22, 26. The thermal coefficient of expansion of the screens 22, 26 in the insulating layer 24 is substantially the same.

The shield 16 illustrated in FIG. 1 comprises a multiplicity of relatively thin metallic straps 30 helically wrapped round the insulating means 14 in a manner to be described more fully hereinafter. The straps 30 are desirably edge abutted as illustrated in FIG. 1. The straps 30 are desirably made of a material which does not oxidize or deteriorate at elevated temperatures. Materials admirably suited for the straps 30 comprise copper, copper alloys and laminates having copper or copper alloy exteriors.

The outer jacket 18 comprises one or more turns of a suitable tape 32, such as polyethylene terephthalate film or the like. The tape 32 affords a moisture barrier and has other functions as is well known in the prior art. The outer jacket 18 also comprises a layer of polymeric resin 34 which may be polyvinyl chloride or other suitable material.

Figure 2:
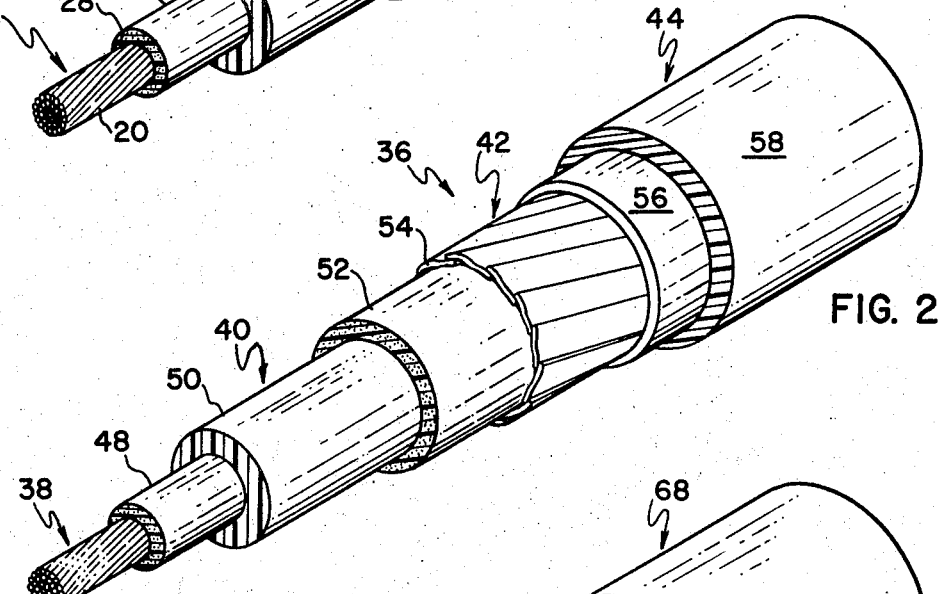
FIG. 2 is a view similar to FIG. 1 illustrating the shield means as comprising a multiplicity of helically wound metallic tapes.

Referring to FIG. 2, there is illustrated a power cable 36 comprising as major components a central conductive core 38, insulating means 40 surrounding the core 38, shield means 42 and an outer jacket 44.

The conductive core 38 is illustrated as comprising stranded wires 46. The insulating means 40 is illustrated as comprising an inner screen 48, an insulating layer 50 and an outer screen 52.

The shield 42 comprises a multiplicity of relatively thin metallic tapes 54 helically wrapped about the insulating means 40 in a manner to be described more fully hereinafter. As illustrated in FIG. 2, the tapes 54 are typically overlapped.

The outer jacket 44 comprises one or more turns of a suitable tape 56, such as polyethylene terephthalate or the like. The outer jacket 48 may also be comprised of a layer of polymeric resin 58.

Figure 3:
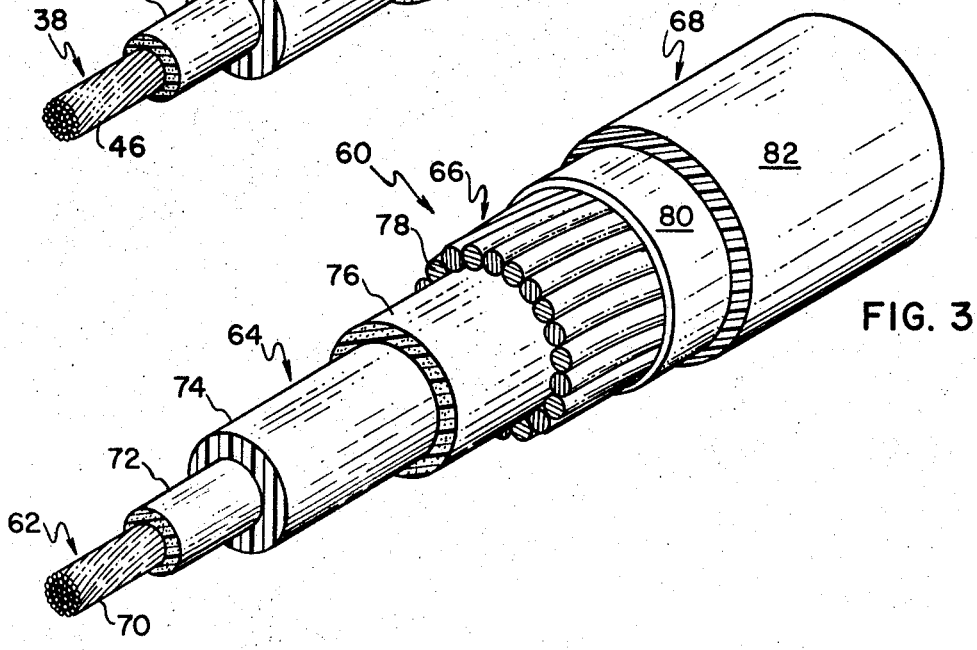
FIG. 3 is a view similar to FIGS. 1 and 2 illustrating the shield means as comprising a multiplicity of helically wound metallic wires.

Referring to FIG. 3, there is illustrated a power cable 60 comprising as major components a central conductive core 62, insulating means 64, shield means 66 and an outer jacket 68. The conductive core 62 typically comprises stranded copper wires 70. The insulating means 64 comprises an inner screen 72, an insulating layer 74, and an outer screen 76.

The shield 66 comprises a multiplicity of metallic wires 78 helically wrapped about the insulating means 64 in a manner to be more fully described hereinafter. The outer jacket 68 comprises one or more turns of a suitable tape 80 and a layer of polymeric resin 82.

As stated previously, the operating features of the shields 16, 42, 66 include a low resistance return path for fault current in the event of insulation failure and the characteristic of not exerting undue strain on the cable insulation. In order to adequately perform these functions, the shield elements 30, 54, 78 should not be subject to mechanical deterioration. Bending or flexing of the cables 10, 36, 60 is one typical type of mechanical deterioration. If the shields 16, 42, 66 comprised a solid tube, the cables 10, 36, 60 would be quite stiff and bending thereof would fatigue the shield in the area of the bend. Accordingly, the shield of this invention is designed to afford substantial flexibility of the cable.

Another type of mechanical deterioration to which any shield is subjected is that caused by thermal expansion and contraction. It will be apparent, upon reflection, that the temperature of a power cable varies with the current carried thereby and with the ambient temperature to which the cable is subjected. Since the insulation of any power cable expands and contracts in response to temperature change, it will be evident that temperature cycling can have some effect on the shield surrounding the insulation.

As an illustration, a typical power cable includes a shield comprised of a helically applied metallic tape with an approximate 10 percent overlap between adjacent turns. The typical metallic tape is wound unto the insulator with a relatively short lay, e.g., 1-3 inches. As power is passed through the cable, the temperature of the central conductive core increases thereby thermally expanding the insulator. The metallic tape also thermally expands as well as undergoes mechanical stretching. With a short lay, as is typical, the metallic tapes thermally expand insufficiently to accommodate the expansion of the insulation. Accordingly, the metallic tape is stressed substantially, often beyond its elastic limit. When the current passing through the cable is decreased, the temperature of the central conductive core decreases toward ambient. The insulator accordingly thermally contracts. If the metallic tape has been stretched beyond its elastic limit, it does not contract thereby creating an air gap between the insulator and the shield tending toward the creation of corona discharge. In addition, the cable is no longer an integral structural unit since the insulating core is loose within the shield. Mechanical deterioration is also caused at the overlaps of the tapes and is typically the result of stretching and oxidation. If the stretching is of sufficient magnitude, the shield may change configuration from a tube to an open helix. This results in substantially increased resistance of the shield. For example, the measurement of shield resistance of a cable after a moderate period of use often reveals a resistance of eight to 10 times the resistance of the shield when the cable was new.

In this invention, the length of the lay of the metallic shield elements 30, 54, 78 is selected to accommodate expansion and contraction of the insulating means 14, 40, 64 within the elastic limit of the elements 30, 54, 78 respectively while retaining the elements in contact with the insulating means. In the case of the wire shielding elements 78, a lay of this length will deform the outer shield 76. Accordingly, it is preferred to select the length of the lay of the wire shield elements 78 to accommodate expansion and contraction of the insulating means 64 without stressing the wires 78.

The following equations have been derived to determine the minimum lay length for strap and tape shielding elements which will remain tight on the insulating means after load cycling and which maintain stresses in the elements 30, 54 less than the elastic limit thereof. The term "lay length" is defined as the axial distance along the cable required for each strap 30 or tape 54 to completely encircle the insulating means 14, 40 respectively. The equations are:

(1) $$\frac{V_t}{V_o} = Q = 1 + n_i \left[ T_{sh} - T_o + \frac{T_c - T_{sh}}{\operatorname{Log}_e \frac{d_{sh}}{d_c}} \left[ \operatorname{Log}_e \frac{d_{sh}}{2} - \left[ \frac{d_{sh}^2 \left( \operatorname{Log}_e \frac{d_{sh}}{2} - \frac{1}{2} \right) - d_c^2 \left( \operatorname{Log}_e \frac{d_c}{2} - \frac{1}{2} \right)}{d_{sh}^2 - d_c^2} \right] \right] \right]$$

$$d_{exp} = \sqrt{Q (d^2 - d_c^2 + d_c^2)}$$

(2)

$C$ = Shield Length Expanded/Shield Length Starting and is equal to or less than $$n_{sh} (T_{sh} - T_o) + pel/E + 1$$

(3)

Pitch Circumference Expanded = $A = \pi(d_{exp} + t)$ (4)

Pitch Circumference at start = $B = \pi(d_{sh} + t)$ (5)

Lay Length = $\sqrt{A^2 - B^2 - C^2/C^2 - 1}$ (6)

$V_t$ = Volume of insulation at load cycle temperatures
$V_o$ = Volume of insulation at ambient temperatures
$n_i$ = Coefficient of cubic expansion of insulation
$T_{sh}$ = Shield temperature in load cycle — °C
$T_o$ = Ambient temperature — °C
$d_c$ = Diameter of conductor — in.
$T_c$ = Conductor temperature in load cycle — °C
$d_{sh}$ = Diameter under shield at ambient temperature — in.
$d_{exp}$ = Diameter under shield at load temperature — in.
$t$ = Thickness of shield — in.
$n_{sh}$ = Linear coefficient of expansion of shield material — in/in°C
$pel$ = Proportional elastic limit of shield material — psi
$E$ = Young's modulus of elasticity — psi
Lay Length = Calculated lay which will allow the increased shield length required by the expanded core diameter to occur within the elastic limit of the shield material.

An analysis of these equations will reveal that the thermal expansion of the conductive core per se has been disregarded. This particular facet of temperature effects has proved to be rather minor compared to thermal expansion of the insulation and screens.

As an example, a power cable having a conductive core diameter of 1.25 inches, an outer screen diameter of 2.75 inches and a strap thickness of 0.020 inches was selected. The ambient temperature of the cable was 20° C, the shield temperature in the load cycle was 90° C and the conductor temperature in the load cycle was 120° C. The coefficient of cubic expansion of the insulating means is 0.0002316 cubic inches/° C. The coefficient of linear expansion of the metallic strap or tape elements is $16.6 \times 10^{-6}$ in./in./° C the proportional elastic limit of the shield material is 5,000 psi and the Young's modulus of elasticity is $15.6 \times 10^6$ psi. The calculations from equation (1) revealed that Q = 1.0188. Calculations from equation (2) revealed that $d_{exp}$ = 2.7704 indicating an expansion of 0.0204 inches. Calculations from equation (3) revealed that C was equal to or less than 1.00148. The expression to the right of equation (3) constitutes a maximum limit for the ratio of the shield length expanded to shield length starting. Calculations from equation (4) revealed that the expanded circumference was 8.7036 inches while the calculations from equation (5) indicated an initial circumference of 8.6398 inches revealing a circumferential growth of 0.0638 inches. The minimum lay length calculated from equation (6) was 17.380 inches.

Figure 4:
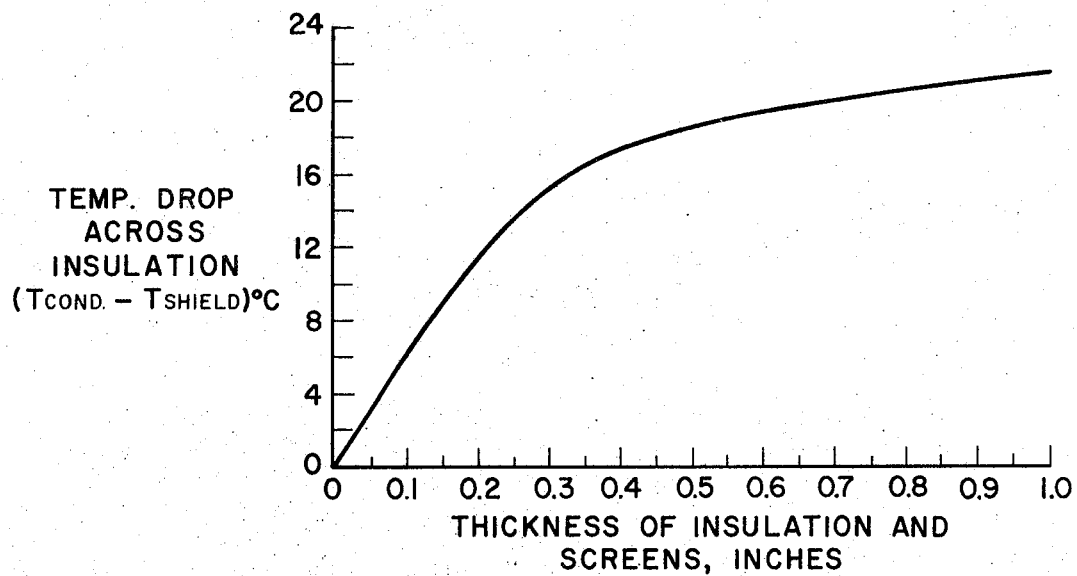
FIG. 4 is a graph illustrating the difference between conductor temperature and shield temperature as a function of insulation and screen thickness.

Referring to FIG. 4, there is illustrated the relationship of the difference between conductor temperature and shield temperature as a function of insulation and screen thickness. Equation (1) takes this phenomenon into account. For purposes of more simplified calculations, one may wish to assume that there is no variation in temperature across the insulator which simplifies equation (1) into the following:

(7) $$\frac{V_t}{V_o} = Q = 1 + n_i \left[ T_{sh} - T_o + \frac{T_c - T_{sh}}{\operatorname{Log}_e \frac{d_{sh}}{d_c}} \left( \operatorname{Log}_e \frac{d_c}{2} + \frac{1}{2} \right) \right]$$

Taking the previous example as exemplary, $Q$ from equation (7) equals 1.019. Using this value of $Q$ in equation (2) reveals that $d_{exp}$ equaled 2.768 indicating an expansion of 0.018 inches. Calculations from equation (3) revealed C was equal to or less than 1.0015. Using the new value for $d_{exp}$ in equation (4) revealed that the expanded circumference was 8.758 inches. Since equation (5) is not affected by the new value for $Q$, the initial circumference remained at 8.702 inches revealing a circumferential growth of 0.062 inches. The minimum lay length calculated using equation (6) was 15.980 inches. It will accordingly be seen that calculations using equation (7) provide a fair approximation of the more correct values afforded by equation (1).

Figure 5:
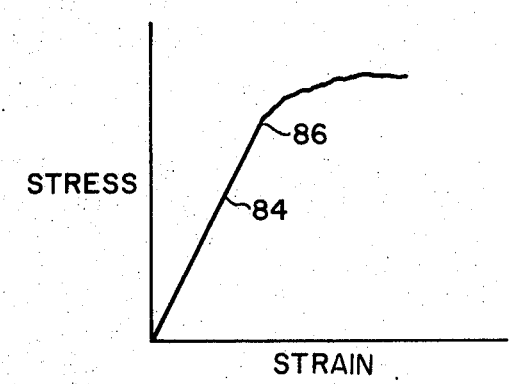
FIG. 5 is a stress-strain diagram of the material comprising the shield illustrated in the cables of FIGS. 1-3.

It will be apparent that the straps 30 and tape 54 must elongate to accommodate growth of the insulating means 14, 40 respectively at elevated temperatures. Elongation of the straps 30 and the tapes 54 has two components: thermal expansion and mechanical stretching. By selecting a lay length at least as long as dictated by the equations previously stated, the thermal expansion component is sufficiently large to maintain the stress in the straps 30 and the tapes 54 below the elastic limit thereof. There is illustrated in FIG. 5 a stress-strain diagram of a typical material used for the straps 30 and tapes 54. The straight line portion 84 illustrates the range of stress where the straps 30 and tapes 54 elastically recover from stresses imposed thereon. As stress of the straps 30 and tapes 54 passes the elastic or proportional elastic limit 86 of the material, the straps 30 and tapes 54 obtain a permanent set and do not recover their initial length upon removal of the stress.

As mentioned previously, the lay length of the wire shielding elements 78 is preferably selected to accommodate expansion and contraction of the insulating means 64 without placing the wires 78 in tension. This prevents the deformation of the outer screen 76 while retaining the wire 78 in contact therewith. An inspection of equations (1)–(6) reveals that the only component related to elastic stretching is found in equation (3) and is expressed as pel/E. Deleting this component from equation (3) provides an expression suitable as a maximum limit for the ratio of expanded to starting shield length of wire shielding elements, as follows:

C = Shield Length Expanded/Shield Length Starting
and is equal to or less than $n_{sh}(T_{sh} - T_o) + 1$ (8)

As an example, a power cable having a conductive core diameter of 1.25 inches, an outer screen diameter of 2.75 inches and comprising a shield of metallic wires having a diameter of 0.20 inches were selected. The ambient temperature of the cable was 20° C, the shield temperature in the load cycle was 90° C and the conductor temperature of the load cycle was 120° C. The coefficient of cubic expansion of the insulating means is 0.0002316 cubic inches/° C. The coefficient of expansion of the metallic wires is $16.6 \times 10^{-6}$ in./in./°C. The calculations from the equation (1) revealed that Q equalled 1.0188. Calculations from equation (2) revealed that $d_{exp}$ equals 2.7704 indicating an expansion of 0.0204 inches. Calculations from equation (8) revealed that C was equal to or less than 1.0011. Calculations from equation (4) revealed that the expanded circumference was 8.7036 inches while the calculations from equation (5) indicated an initial circumference of 8.6398 inches revealing a circumferential growth of 0.0638 inches. The minimum lay length calculated from equation (6) was 20.170 inches. It will accordingly be seen that the lay length of wire shielding elements is longer since such elements are not elastically stretched during high temperature operations.

A similar example involving the same parameters except that the wire shielding elements have a diameter of 0.040 inches reveals that the minimum lay length is 20.230 inches.

The maximum lay length of the shielding elements 30, 54, 78 is dictated by the desired flexibility of the cables 10, 36, 60 respectively. If the elements 30, 54, 78 were straight, i.e., having an infinite lay length, the cables 10, 36, 60 respectively would be exceedingly stiff and any bending thereof would require mechanical deformation of the elements themselves. It is not contemplated that the lay length of the elements will exceed 20 times the diameter of the shield. If the lay length given in the examples were selected to be about 30 inches, the elements would have some tendency to thermally elongate a greater distance than is required by the thermal expansion of the insulating means. This would seem to indicate, at first blush, that the maximum lay length of the straps 30 and tapes 54 should be a length where the thermal expansion thereof is sufficient to accommodate the thermal expansion of the insulating means 14, 40 respectively. This would also seem to indicate, at first blush, that the only desirable lay length of the wire elements 78 is the minimum lay length calculated using equations (1), (2), (8) and (4)–(6). While this may theoretically be a consideration, it is not a practical one since the elements 30, 54, 78 can undergo axial compression and since the elements are held against the respective insulating means by the outer jackets 18, 44, 68 respectively.

The problem uncovered during development of this invention apparently either does not exist in prior art cables because of the operating conditions thereof or has not been recognized. FIG. 6 illustrates the effect of the operating temperature range and the combined thickness of the insulating layer and the screens on the shield. The illustration assumes a conventional power cable having a one inch diameter conductor and a shield comprised of a metallic tape helically wound at a 75° angle as is now conventional. In operating conditions above and to the right of the curve 88, the shield is permanently stretched during the load cycle. At operating conditions between the curves 88, 90 the shield is permanently stretched from zero to one-tenth of 1 percent. At operating conditions between the curves 90, 92 the shield is permanently stretched between one-tenth and two-tenths of 1 percent.

It may seem, at first blush, that one-tenth of 1 percent shield expansion is of no substantial importance. Assuming a one inch conductor with a half inch thick insulator and shield, one-tenth of 1 percent permanent shield expansion means a shield growth of 0.002 inches. Assuming for purposes of illustration that the load is removed from the cable with the voltage still impressed thereon, the cable will cool down and there will appear one or more gaps totalling 0.002 inches between the shield and the underlying insulation. This is clearly sufficient to promote corona discharge thereby deteriorating the insulation and resulting in premature cable failure. It will accordingly be seen that even a very slight degree of permanent expansion of the shield has quite undesirable results.

A study of FIG. 6 will reveal that low current cable, e.g., cable used for communication purposes, does not have the problem of permanently elongating the shield since current passing through such cable is not sufficient to expand the insulation sufficiently to set the shield.

From FIG. 6 it will be seen that about a 10° C temperature rise in the conductive core creates permanent stretching of the cable used as the example for most ratios of insulation and screen thickness. The exact temperature rise sufficient to create this problem varies as a function of conductor size, insulation and screen thickness, coefficient of expansion of the insulation and screen and other parameters as will be apparent. In general, conventional power cables are presently designed for operation at core temperature differentials of 40°–80° C. This invention is accordingly most applicable for power cables designed to operate at temperature differentials of at least 40° C.

I claim:

1. A power cable of the type comprising an inner conductive core for carrying electrical energy; insulating means, around the core and of sufficient thickness to insulate the same, subject to thermal expansion upon passage of current through the core and thermal contraction upon lessening current passage therethrough; metallic shield means comprising a multiplicity of helically wound elongate metallic elements providing a generally flat surface in contact with the insulating means providing a low resistance return path; the insulating means being of sufficient thickness to impart a permanent stretch to the metallic elements when the core is operated through a predetermined temperature range of at least 40° C; the improvement wherein the shield means comprises means for accommodating thermal expansion of the insulating means above the predetermined temperature range to maintain the stress in the metallic elements below the elastic limit thereof, the accommodating means comprising the length of the lay of the metallic elements, the length of the lay being at least $\sqrt{A^2 - B^2 - C^2/C^2 - 1}$ where $A = \pi(d_{exp} + t)$; $B = \pi(d_{sh} + t)$; $C =$ Shield Length Expanded/Shield Length Starting and is equal to or less than $n_{sh}(T_{sh} - T_o + pel/E + 1)$; $d_{exp} =$ diameter under the elements at load temperature; $t =$ thickness of the metallic elements; $d_{sh} =$ diameter under the elements at ambient temperature; $n_{sh} =$ linear coefficient of thermal expansion of the elements; $T_{sh} =$ shield temperature during load; $T_o =$ ambient temperature; $pel =$ proportional elastic limit; $E =$ Young's modulus.

2. The power cable of claim 1 wherein the metallic elements are of predetermined thickness and have a dimension transverse to the core substantially greater than the thickness dimension.

3. The power cable of claim 2 wherein the metallic elements are straps.

4. The power cable of claim 2 wherein the metallic elements are tapes.

5. The power cable of the type comprising an inner conductive core for carrying electrical energy; insulating means, around the core and of sufficient thickness to insulate the same, subject to thermal expansion upon passage of current through the core and thermal contraction upon lessening current passage therethrough; metallic shield means comprising a multiplicity of helically wound elongate metallic elements in contact with the insulating means providing a low resistance return path; the insulating means being of sufficient thickness to impart a permanent stretch to the metallic elements when the core is operated through a predetermined temperature range of at least 10°C; the improvement wherein the length of the lay of the elements is at least $\sqrt{A^2 - B^2 - C^2/C^2 - 1}$ where $A = \pi(d_{exp} + t)$; $B = \pi(d_{sh} + t)$; $C =$ Shield Length Expanded/Shield Length Strating and is equal to or less than $n_{sh}(T_{sh} - T_o + pel/E + 1)$; $d_{exp} =$ diameter under the elements at load temperature; $t =$ thickness of the metallic elements; $d_{sh} =$ diameter under the elements at ambient temperature; $n_{sh} =$ linear coefficient of thermal expansion of the elements; $T_{sh} =$ shield temperature during load; $T_o =$ ambient temperature; $pel =$ proportional elastic limit; $E =$ Young's modulus.

6. The power cable of claim 5 wherein the elements are of predetermined thickness and have a dimension transverse to the core substantially greater than the thickness dimension.

7. The power cable of claim 5 wherein the elements are wires.

8. The power cable of claim 7 wherein the length of the lay is at least $\sqrt{A^2 - B^2 - C^2/C^2 - 1}$ where $A = \pi(d_{exp} + t)$; $\pi(d_{sh} + t)$; $C =$ Shield Length Expanded/Shield Length Starting and is equal to or less than $n_{sh}(T_{sh} - T_o + 1)$; $d_{exp} =$ diameter under the elements at load temperature; $t =$ thickness of the metallic elements; $n_{sh} =$ linear coefficient of thermal expansion of the elements; $d_{sh} =$ diameter under the elements at ambient temperature; $T_{sh} =$ shield temperature during load; $T_o =$ ambient temperature.

9. A power cable of the type comprising an inner conductive core for carrying electrical energy; insulating means, around the core and of sufficient thickness to insulate the same, subject to thermal expansion upon passage of current through the core and thermal contraction upon lessening current passage therethrough; metallic shield means comprising a multiplicity of helically wound elongate metallic elements providing an arcuate surface in contact with the insulating means providing a low resistance return path; the insulating means being of sufficient thickness to impart a permanent stretch to the metallic elements when the core is operated through a predetermined temperature range of at least 40° C; the improvement wherein the shield means comprises means for accommodating thermal expansion of the insulating means above the predetermined temperature range to maintain the stress in the metallic elements below the elastic limit thereof, the accommodating means comprising the length of the lay of the metallic elements, the length of the lay being at least $\sqrt{A^2 - B^2 - C^2/C^2 - 1}$ where $A = \pi(d_{exp} + t)$; $B = \pi(d_{sh} + t)$; $C =$ Shield Length Expanded/Shield Length Starting and is equal to or less than $n_{sh}(T_{sh} - T_o + 1)$; $d_{exp} =$ diameter under the elements at load temperature; $t =$ thickness of the metallic elements; $d_{sh} =$ diameter under the elements at ambient temperature; $n_{sh} =$ linear coefficient of thermal expansion of the elements; $T_{sh} =$ shield temperature during load; $T_o =$ ambient temperature.

10. The power cable of claim 9 wherein the metallic elements comprise wires of generally circular cross-section.

* * * * *